US006848994B1

(12) United States Patent
Knust et al.

(10) Patent No.: US 6,848,994 B1
(45) Date of Patent: Feb. 1, 2005

(54) AUTOMATED WAGERING RECOGNITION SYSTEM

(75) Inventors: Randy L. Knust, The Woodlands, TX (US); Eric Schoppe, Conroe, TX (US); Richard Garza, Texas City, TX (US)

(73) Assignee: Genesis Gaming Solutions, Inc., The Woodlands, TX (US)

( * ) Notice: Subject to any disclaimer, the term of this patent is extended or adjusted under 35 U.S.C. 154(b) by 0 days.

(21) Appl. No.: 09/483,854

(22) Filed: Jan. 17, 2000

(51) Int. Cl.[7] .................................................. A63F 9/24
(52) U.S. Cl. ...................... 463/25; 463/29; 273/148 R; 348/143
(58) Field of Search .......................... 463/9–14, 29–31, 463/25, 42; 348/143, 150, 161, 232, 659, 662, 705; 273/309, 460, 138.1; 434/110, 128, 129; 235/375, 379, 437, 454; 382/1, 115, 116, 135, 139, 140, 100; 705/44; 108/50.02, 92, 23

(56) References Cited

U.S. PATENT DOCUMENTS

| | | | | |
|---|---|---|---|---|
| 4,982,400 A | * | 1/1991 | Ebersole ..................... 370/407 |
| 5,283,422 A | * | 2/1994 | Storch et al. ................ 235/375 |
| 5,451,054 A | * | 9/1995 | Orenstein ................ 273/148 R |
| 5,726,706 A | * | 3/1998 | Walsh .......................... 348/151 |
| 5,781,647 A | | 7/1998 | Fishbine et al. ................ 382/1 |
| 5,919,090 A | * | 7/1999 | Mothwurf ..................... 463/25 |
| 6,008,867 A | * | 12/1999 | Cooper et al. ............... 348/705 |
| 6,313,871 B1 | * | 11/2001 | Schubert ...................... 348/143 |
| 6,344,874 B1 | * | 2/2002 | Helms et al. ................ 348/164 |

* cited by examiner

*Primary Examiner*—Mark Sager
*Assistant Examiner*—Steven Ashburn
(74) *Attorney, Agent, or Firm*—Law Office of Tim Cook P.C.

(57) ABSTRACT

A system and method for acquiring and analyzing the bets at a plurality of locations at a plurality of tables is provided. The system includes a gaming table with a raised platform, underneath which is positioned a video camera for each of the wagering locations on the table. The video cameras one each table are coupled together into a multiplexer, and the multiplexers from the plurality of tables are coupled together and into a central computer. The system and method thus eliminate the labor intensive and often inaccurate technique of tracking the gambling habits of patrons at the gaming tables.

11 Claims, 3 Drawing Sheets

AUTOMATED WAGERING RECOGNITION SYSTEM

FIELD OF THE INVENTION

The present invention relates generally to the field of wagering systems and, more particularly, to a system and method for recognizing, recording, and tracking bets at a gaming table with the aid of a computer.

BACKGROUND OF THE INVENTION

The casino and gaming businesses provide special rewards for their valued customers to determine the level of complimentary benefits those customers should receive. Presently, this system is managed by a person such as a pit boss or other casino employee on the casino floor. Such a person keeps detailed notes about certain players and tries to determine the length of time a player gambles, the total amount of money bet in one sitting, the average amount wagered at each bet, and other information about these players. The casino may then determine which players receive benefits such as lodging, meals, and other forms of special treatment.

The system just described depends almost entirely on the alertness and subjective analysis of the casino's floor observer or pit boss. Despite his best efforts, the pit boss can only observe a limited number of players at a time, and thus large casinos require quite a number of floor observers to cover the entire casino. Such a system is expensive, and by its very nature subject to mistakes in not gathering all of the available information to fully implement and exploit the system.

Fishbine et al., in U.S. Pat. No. 5,781,647 suggested a system that assists gambling operations at casinos in accurately tracking the gambling habits of its customers. The Fishbine et al. system tracked the length of the time a player played, amount of money he bet, and the average amount he wagered at each bet in order to determine incentives and complimentary benefits (free meals, limo, room, etc.) which should be offered to the right players. Such a system was also used to determine a player's pre-established credit rating.

However, the Fishbine et al. system apparently used a dedicated system for each player and was thus very expensive and inefficient for a large gambling operation. What is really needed is a system that can track the gambling of many players simultaneously in one system, and thereby perform the supervisory duties of one or more floor supervisors in a casino. Further, the Fishbine et al. system used an edge detection algorithm to sense the edge of each chip in a stack of gambling chips to determine the amount of a bet and such an algorithm has proved prone to errors in making such a determination. The Fishbine et al. also made no allowance for the effective placement of video cameras in order to capture an accurate image of the gambling area. Thus, there is also a need for a computer driven visual system for the gaming industry to more accurately determine the amount of a bet and to transmit information about a plurality of such bets to a central location for use and analysis.

SUMMARY OF THE INVENTION

The system of the present invention addresses these and other needs and drawbacks in the art to automatically track every bet made on a casino table game where the players gambling chips are placed in a predetermined area on the table surface for certain selected casino games. This allows the system to identify the player making the bet and assign the wager amount to his record.

The system includes a system of electronic computer hardware and software that can acquire a video (analog or digital) image of a stack of gambling chips placed in the betting area on the casino table. This is done by placing a color video camera or other video imager at the top level of a gaming table directly in front of each betting area and sending a video signal into an image grabber board located in a central computer unit. The position of the camera is critical for the analysis procedure.

The system and method of this invention can also quickly switch between individual players' bets at a specific table to acquire video signals between cameras on a table and from table to table. This feature is important for the acquisition and analysis of the gambling habits of a plurality of players. To accomplish this task, the system includes a video multiplexer having a plurality (such as, e.g., eight) video inputs and one video display. These multiplexers may preferably be linked together to send a video signal from any camera in the pit to one central computer for image acquisition and analysis.

The system may also initiate the video read and capture from the active cameras on the casino table with a trigger device. This device can be any kind of electronic button, foot pedal, mouse pad, etc., controlled, for example, manually by a dealer.

Another feature of the present invention includes registering a client and designating his seat position at the table. This may be accomplished in a variety of easily implemented ways, such as for example with a commercial magnetic card swipe reader with an attached keypad for data input.

The system can also send data from the trigger, magnetic card reader, and keypad into the central computer. This is carried out using a computer serial board designed to accept data from the trigger, magnetic card reader, and keypad. These boards can be daisy-chained together and data can be sent through a serial cable from any table in the pit to one central computer for identification and processing.

In order to eliminate spurious signals, the system can also hide and shelter the cameras on the table. The system includes a table platform to sit on top of the casino table, allowing the player to set his chips, drinks, and other items on top of the platform. The platform is lined with a light source (rope light, neon light, fluorescent light, or other light) to illuminate the chip stack with a consistent light. This feature prevents a shadow effect on the bottom chips and also gives a more consistent color scheme or pattern for analysis.

Finally, the system can store data into a player tracking database program for viewing and analysis. This permits the casino to accurately track the playing of many players simultaneously in real time, and thus eliminates the inaccuracies and subjective analysis of casino floor observers.

These and other features and objects of this invention will be apparent to those skilled in the art from a review of the following detailed description and the accompanying drawings.

DETAILED DESCRIPTION OF A PREFERRED EMBODIMENT

Figure 1:
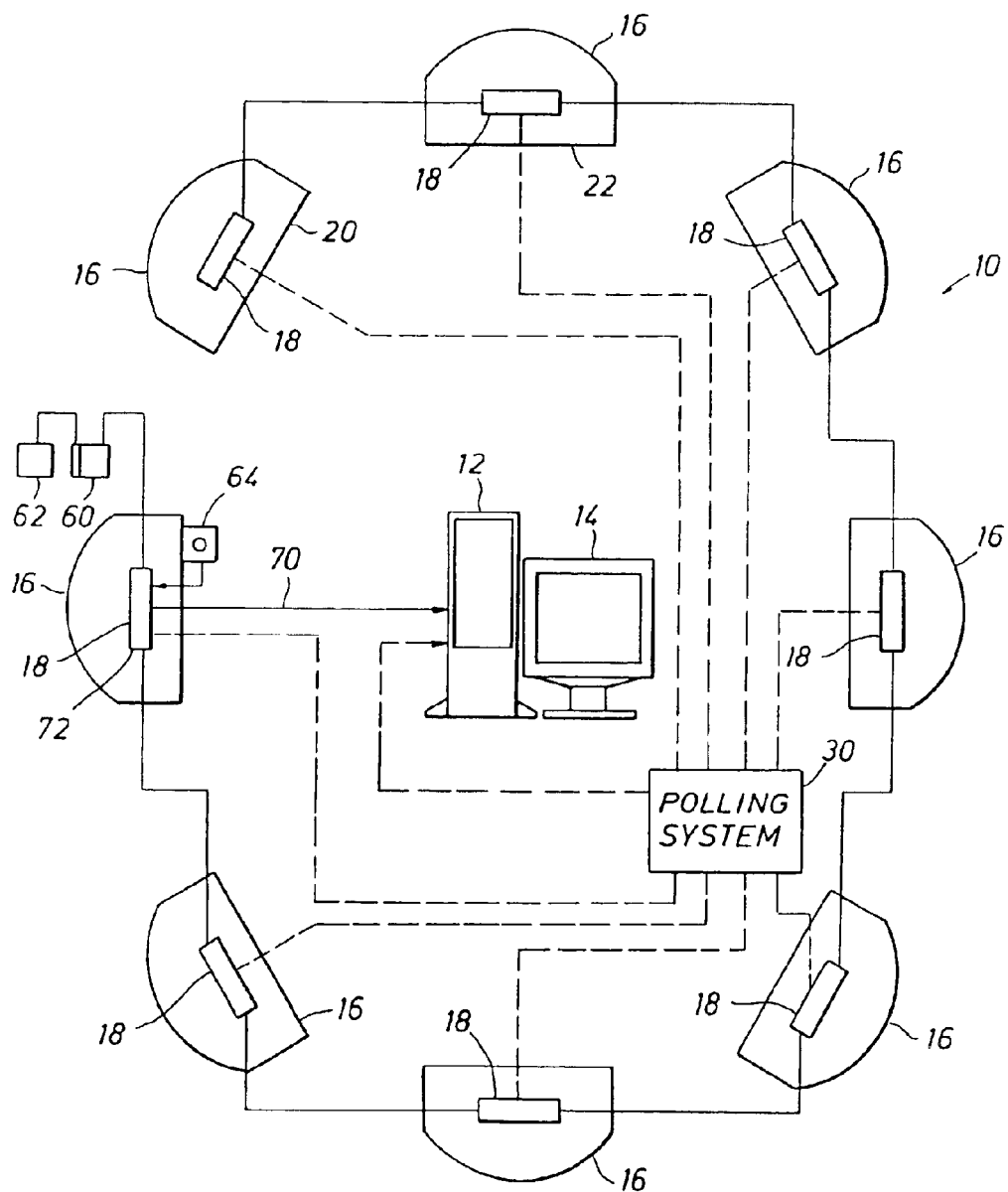
FIG. 1 is an overall schematic diagram of the gaming system of this invention.

FIG. 1 depicts an overall system diagram of the computer assisted wagering recognition system of this invention, designated in FIG. 1 by the numeral 10. The system 10 includes a central computer 12 and accompanying monitor 14. The system further includes a plurality of gaming tables 16, of which eight are shown in FIG. 1, although the system may include any number of such gaming tables. Further details of a gaming table 16 are shown below with regard to FIGS. 2 and 3.

Figure 2:
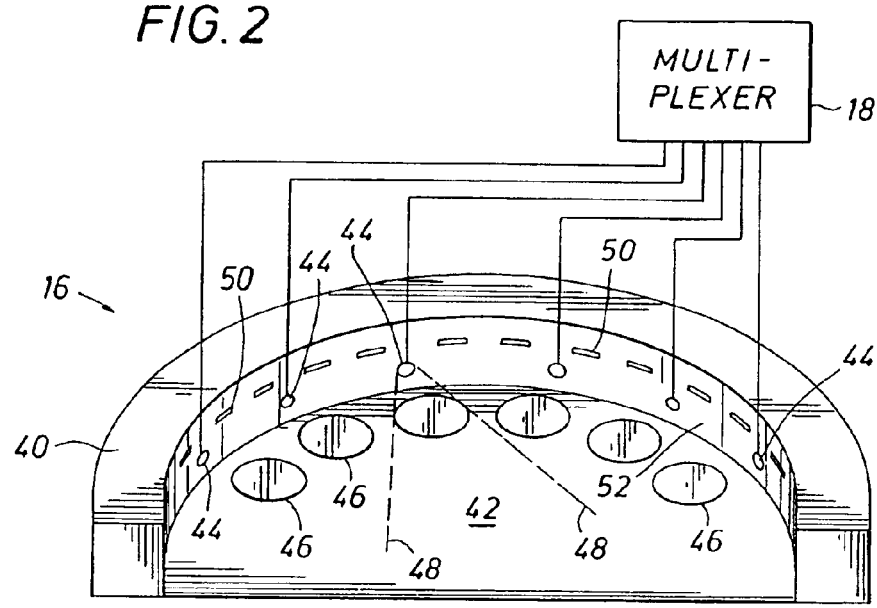
FIG. 2 is a perspective view of a gaming table including the cameras and lighting aspects of this invention.
Figure 3:
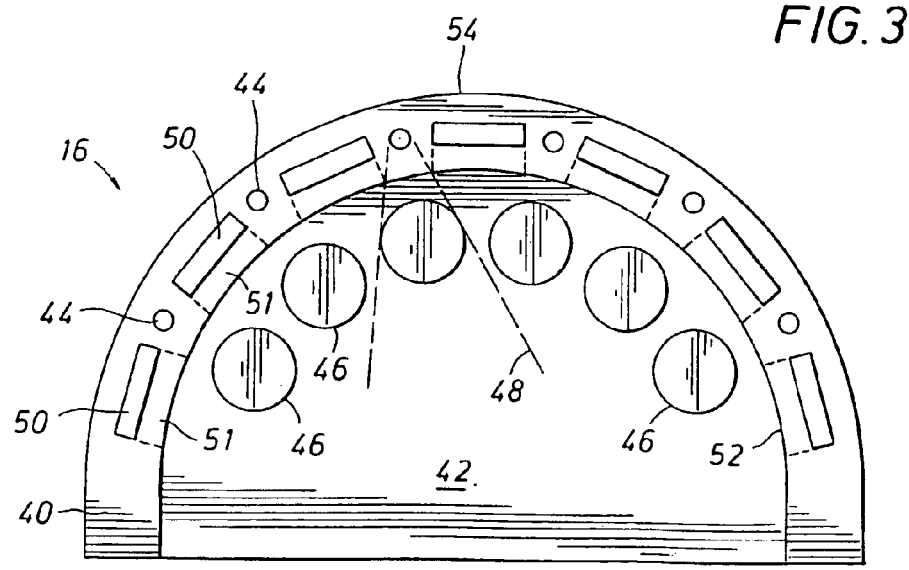
FIG. 3 is a plan view of the gaming table of FIG. 2.

In a preferred embodiment, the system 10 further includes a video multiplexer 18 at each table, or associated with each table, regardless of where the multiplexer 18 is physically located. The multiplexer 18, which is described in greater detail below, receives inputs from a plurality of individual gaming sites, most clearly embodied in a video input from one gaming seat, as shown in FIGS. 2 and 3. In a first alternative embodiment, the plurality of multiplexers 18 are joined together in series, or daisy-chained, so that data from a first table 20 is passed along to a second table 22, as so on until the data from all of the tables is passed along to the central computer 12, such as for example into an RS-232 input of the computer. In a second alternative embodiment, the system 10 further includes a polling system 30, which signals each of the multiplexers 18 in turn, assembles a data packet of information including data from all of the tables 16, and forwards this data packet along to the central computer 12.

FIGS. 2 and 3 show further details of a gaming table 16 in accordance with this invention. FIG. 2 shows a perspective view, and FIG. 3 shows a plan view of the table 16. The table 16 includes a platform 40 which is elevated slightly above a playing surface 42. The platform is used by players to hold chips, drinks, and any other items they wish to place on it so that such items are out of the playing surface 42. Underneath the platform 40 are situated a plurality of cameras or video imagers 44, one camera or imager for each player, and, more specifically, one camera for each of plurality of wagering locations 46, on the surface 42. Each camera has a field of view 48 to view all of a wagering location 46 to which the camera is dedicated. Each camera 44 is preferably recessed under the platform 40 (FIG. 3) to prevent extraneous visual images from being received by the camera. This is particularly true because an array of lights 50 is mounted on an inside wall 52 of the platform 40 (FIG. 2) or in a recess 51 beneath the platform (FIG. 3) to illuminate the wagering locations 46 with a uniform and consistent light to minimize shadow effects associated with gambling chips. The lighting on the table also helps to maintain a consistent frequency spectrum of light illuminating gambling chips, regardless of background lighting changes. The lights 50 preferably comprise fluorescent lights, but they may be incandescent or even flexible neon, infrared, and so on. The light from the lights 50 is projected outward onto the wagering locations 46, and away from the lenses of the cameras 44 to more tightly control the image received by the cameras 44 of the chips placed on the wagering locations 46. Further, the light spectrum of the lights 50 is especially selected to be unobtrusive to those sitting around the table, while maximizing the accuracy of the image captured by the cameras.

Note also that a rear edge 54 is preferably flush with the peripheral edge of the gaming table. The platform may be custom made to accommodate any desired gaming table dimension.

Pit Operation Procedure

In operation of this invention, a player sits at a casino table 16, and receives a designation, such as table 1, seat 1. He may hand the dealer his player's card, which preferably include a magnetic stripe which uniquely identifies the player, and provides access to biographical data regarding that player, including gambling history, and available line of credit, if any. The card is swiped into a magnetic card reader 60 and on a keypad 62 (FIG. 1) the dealer indicates to the central computer 12 the seat number the player is sitting in. Although the card reader 60 and keypad 62 are only shown at one table in FIG. 1, each table may have such equipment installed.

Swiping a particular card and keying in a specific seat designation sends a data signal (name and any other information on the card) to the central computer 12 and clocks the player at table 1, seat 1, and the camera 44 in front of his betting circle is activated. If the player does not have a player's card, the dealer registers the player as a guest with the keypad and the above procedure is performed as previously described. The dealer will also have the option to input the player's buy-in on the keypad 62. The keypad may also be used for a variety of other purposes by the dealer for communicating information to the central computer, such as for example certain codes which may be transmitted to a supervisor to relay information about customer, his bets, and other information.

Immediately prior to a deal, the dealer presses a trigger button 64 and a signal is sent into the central computer 12 telling the system to prepare to capture the video streams from the active cameras 44 on table 1. The central computer 12 sends a signal to the multiplexer 18 associated with table 1 and tells the multiplexer 18 to send the video signal from table 1, seat 1 (and any other active seats at the table one by one as controlled by the multiplexer 18) into the computer's image grabber board for capture and analysis. This procedure takes only nanoseconds to complete.

After the image is captured, it is loaded into RAM within the central computer 12 for analysis. The data from the image is then stored in a data base in the central computer 12 under the player's record. Now the data can be retrieved in player tracking software for viewing and analysis.

Operation of the Player Analysis Program

The method of the present invention begins with initializing the system. The central computer is programmed to carry out the method without operator intervention, with certain interrupts entered as required, such as reading in player card data and designating table/seat values as valid when a player sits to play.

The program begins by reading all chip sample values from a central database, assigning visible characteristics to each denomination of chip. The system them reads operational variable values from a central database in the central computer 12 to fine tune the interpolation algorithm, skew analysis, chip sample height nominal values, maximum chips in stack to process, and chip matching method by seat, table, casino, or any combination of these values.

Next, the system initializes all video multiplexer boards through the parallel port into the central computer. At this point, the system is now ready to begin tracking player activity and to receive inputs from the tables, such as trigger inputs from the dealers at the various tables and video inputs from the cameras.

Once a dealer initiates a signal at his assigned table, preferably from the keypad 62, the system calls a process to read all active seats at the triggered table. The system then recursively calls the video multiplexer 18 for that table to cycle through all active seats at the table and store a binary representation of each video picture in RAM at the central computer 12.

Based on the initialization sequence previously described, the system then finds a theoretical chip stack of n chips (where n is the predetermined maximum number of chips to read in a stack) from each stored video image in RAM and selects a desired sample area based on the predetermined field of view 48. Fishbine et al., U.S. Pat. No. 5,781,647, teaches an edge detection scheme to determine the value of bets, but we have found this technique to be inadequately accurate for the purpose of gathering precise data regarding the amount of each bet from a plurality of wagering locations at a plurality of tables and in real time.

Once the desired sample area has been determined, the system uses any appropriate interpolation algorithm to find the contact point or line between the bottom edge of the bottom chip in the stack based upon contrast, width, and steepness of the bottom chip against the table surface. The system calculates the inherent skew in the stack introduced by the camera location to allow for varying chip heights based upon each chip's theoretical placement in the stack. With the camera positioned a variable distance from the chip stack (but constant, known height above the surface 42), the stack's distance from the camera will determine the height of each theoretical chip in the stack. The vertical skew is estimated using a logarithmic curve calculation based on variables inherent with each seat including variable chip stack distances, chip height, and camera lens size. The formula to calculate the curve of vertical skew is:

$$y = (b*((m1\char`\^x1)*(m2\char`\^x2)*(\ldots))) \tag{1}$$

where:
b=constant of 1
m=chip height at x pixel location
x=pixel location of bottom chip table contact point
Y is solved as the width of the theoretical chip currently being processed by solving the formula:

$$y = b*(m^x)$$

where:
b=y intercept of the line
m=slope of the line
x=pixel location of bottom chip table contact point.

Next, the system calculates each chip's height from the chip stack using the skew algorithm and selects a center sample height of n*m pixels (where n is the sample height in pixels and m is the sample width in pixels). Then, it compares each theoretical sample chip area against the stored base samples to determine each chip's monetary value. In this step, the system performs a statistical analysis comparison of each sample area utilizing mean, median, standard deviation, average, minimum, and maximum values calculated from the multiple image component planes of the sample area of each chip. The planes may be Red, Green Blue (RGB) or Hue, Saturation, and Lightness (HSL) or any combination of these. Alternatively, the system may perform any appropriate particle analysis correlation algorithm to determine a unique pattern on each sample area correlated against a set of assigned patterns with associated monetary values. The system may also use a combination of these algorithms to determine chip stack value.

Next, using previously stored calibration data, the system finds the stored base sample that best matches the theoretical chip sample area within a predetermined tolerance factor to assign a monetary value to the bottom-most chip. If a base sample area does match and a monetary value is assigned, the process continues up to the next higher chip in the stack. If no base sample area matches the theoretical sample area within the tolerance constraint, then the theoretical stack is assumed to have ended and no more theoretical chips are processed in the theoretical stack. In such a case, processing continues at the next active seat image.

Once the system has a match to the store data value, it stores the monetary value of the theoretical chip stack to the central database for the table/seat combination being analyzed.

Multiplexer Specifications

The video multiplexer (VM) 18 is a standard National Television Standards Committee (NTSC) (or any other appropriate format) video signal routing device with 8 inputs and 1 output. The VM may be used with 7 other VM's connected in series, as shown in FIG. 1, or the VM's may be coupled in a star arrangement in the alternative embodiment of FIG. 1.

Once all 8 VM's are connected to each other with control from a PC and video inputs from NTSC cameras, they are capable of choosing from any of 57 video signals. Typically, the seven cameras per board will be chosen before accessing cameras on a different board.

Figure 4:
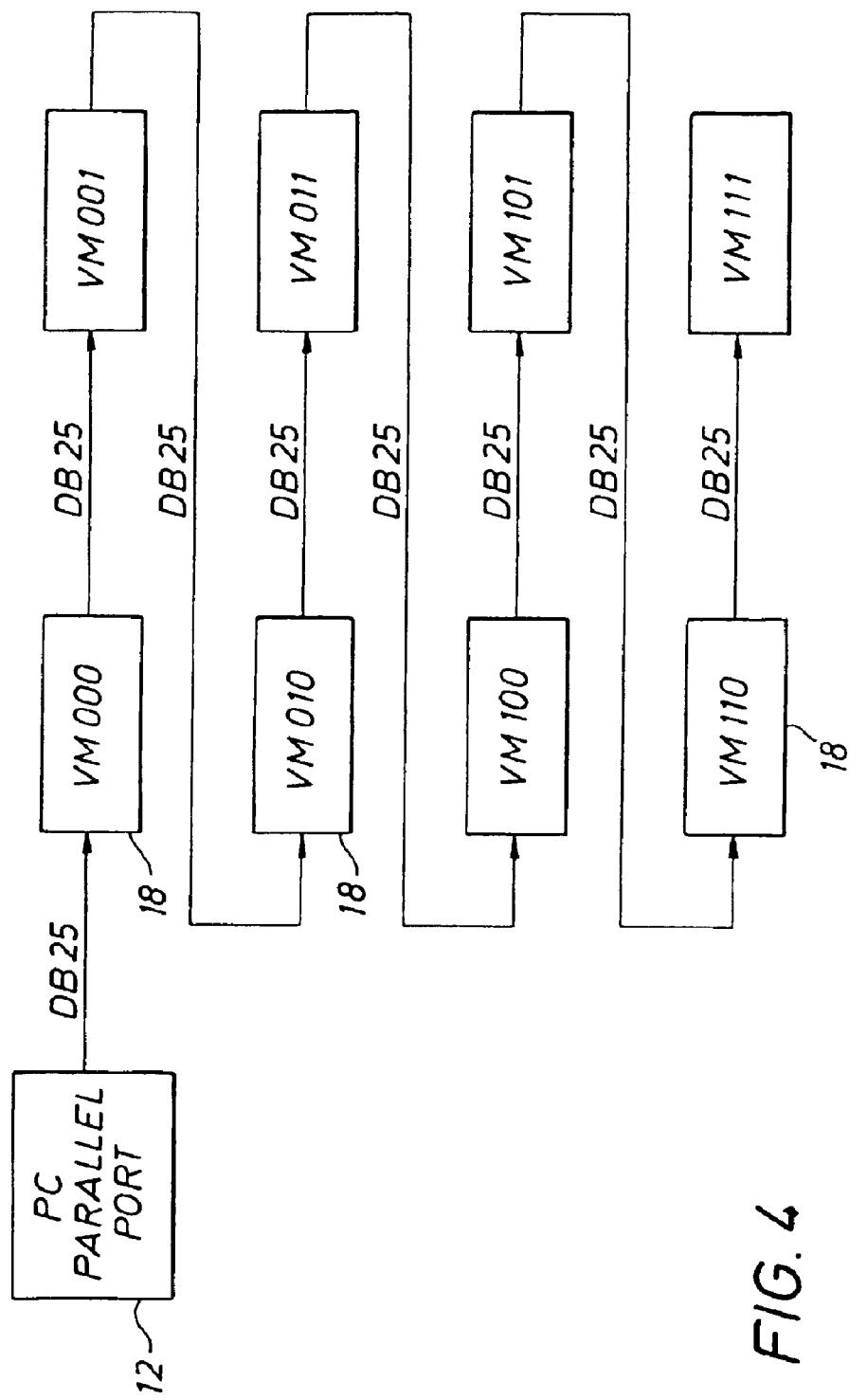
FIG. 4 is an electrical schematic diagram illustrating the preferred arrangement for a plurality of video multiplexers arranged in tandem.

The VM's are designed to be daisy-chained together, as previously described. A first connection 70 couples the central computer 12 to a first VM 72. The VM's address themselves dynamically so no special setup is needed to tell the first VM that it is the first VM. The one connected to the PC will always be the first with an address of $000_2$ to $111_2$. FIG. 4 depicts the preferred data communications arrangement for the multiplexers 18.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A computer implemented gambling tracking system comprising:
   a. a central computer;
   b. a video multiplexer coupled to the central computer;
   c. a gaming table associated with the video multiplexer;
   d. a plurality of video imagers on the gaming table, the video imagers coupled to the video multiplexer, and each of the plurality of video imagers directed to a predetermined wagering location on the table;
   e. a chip recognition system in the central computer to determine the value of the wagers in each of the wagering locations, the recognition system including an algorithm which takes into account multiple image component planes selected from the group consisting of:
      i hue, saturation, and lightness,
      ii particle analysis correlation; and
      iii a combination i and/or ii;
   f. a platform on the table above and adjacent to the predetermined wagering locations wherein each of the plurality of video imagers is located below the platform;

g. an arcuate wall extending between the platform and the table, the arcuate wall defining apertures therethrough, the video imagers positioned behind the arcuate wall and directed through the apertures; and h. a light below the platform and directed to each of the wagering locations, the light providing illumination projecting from the arcuate wall from below the platform laterally toward a predetermined gaming location.

2. The tracking system of claim 1, wherein the light is positioned within a recess beneath the platform.

3. The tracking system of claim 1, further comprising a trigger coupled to the multiplexer to initiate operation of the system.

4. The tracking system of claim 1, further comprising a data input means to uniquely identify a gambler to the tracking system.

5. The tracking system of claim 4, wherein the data input means comprises a magnetic card stripe reader.

6. The tracking system of claim 1, further comprising data input means for inputting alpha-numeric data manually into the central computer.

7. The tracking system of claim 1, further comprising means for determining which of the wagering locations is active.

8. The system of claim 1, wherein the light is underneath the platform.

9. The system of claim 1, wherein the table defines a substantially flat side and a arcuate side, and wherein the table further defines a dealer location along the substantially flat side and a plurality of garner locations along the arcuate side.

10. The system of claim 9, wherein each of the plurality of video imagers is directed from a point adjacent one of the plurality of gamer locations generally in the direction of the dealer location.

11. The system of claim 1, wherein the predetermined wagering location is adapted to support a stack of wagering chips, including a bottom chip, and wherein the light illuminates the stack of wagering chips, including the bottom chip.

* * * * *